3,819,651
PROCESS FOR THE PRODUCTION OF
TETRAHYDROTHIOPHENE
Ernst Worbs, Obernburg, Helmut Magerlein, Erlenbach, and Gerhard Meyer, Obernburg, Germany, assignors to Glanzstoff AG, Wuppertal, Germany
No Drawing. Filed July 10, 1970, Ser. No. 53,998
Claims priority, application Germany, July 18, 1969, P 19 36 565.2
Int. Cl. C07d 63/02
U.S. Cl. 260—332.8
11 Claims

ABSTRACT OF THE DISCLOSURE

Process for the production of tetrahydrothiophene in high yields by reacting tetrahydrofuran with hydrogen sulfide at an elevated temperature, preferably in an approximately equimolar ratio, while employing as the essential catalyst a silica coated aluminum oxide.

---

Tetrahydrothiophene can be obtained by a variety of known processes. For example, German Auslegeschrift No. 1,224,749 describes the reaction of 1,4-butanediol with sulfur and hydrogen. In addition to tetrahydrothiophene, however, relatively large quantities of by-products such as tetrahydrofuran, thiophene and other compounds are formed in this reaction.

It is also known that tetrahydrothiophene can be obtained by reacting tetrahydrofuran with hydrogen sulfide in the presence of certain catalysts. For example, aluminum oxide is used as a catalyst in the process disclosed in United States Pat. No. 2,899,444. This aluminum oxide catalyst may also contain various impurities including such compounds as thoria, chromia or silica. In this process, however, the best yields are obtained only under special conditions and at most amount to 94%, based on the tetrahydrofuran used in the reaction. For example, these high yields can only be achieved when the hydrogen sulfide is reacted in a large stoichiometric excess. Thus, in order to obtain a yield of 94%, hydrogen sulfide must be used in a 6-fold excess. Where the ratio of hydrogen sulfide to tetrahydrofuran is 5.5:1, the yield falls to 86%. Furthermore, such high yields appear to be extremely dependent upon working within a very narrow temperature range which is admittedly difficult to control. When the molar ratio of hydrogen sulfide to tetrahydrofuran is reduced to as low as 2:1, the yield is only 56% at high space velocities and is increased up to 85% only by carefully reducing the space velocity and closely regulating the temperature.

According to German Pat. No. 1,227,913, tetrahydrofuran is also reacted with hydrogen sulfide, using an aluminum oxide catalyst which in this case contains from 0.1 to 10% by weight of a heteropoly acid or an alkali metal or alkaline earth metal salt of this heteropoly acid. Although the use of this catalyst makes it possible to increase the yields as compared to the yields disclosed in the above-noted U.S. Pat. No. 2,899,444, it is again necessary to employ a large excess of hydrogen sulfide. Thus, the molar ratio of hydrogen sulfide to tetrahydrofuran is said to be at least 2:1 but according to the working examples a very high ratio of 6:1 is used.

One object of the present invention is to provide an improved process for the production of tetrahydrothiophene which does not require excessive amounts of hydrogen sulfide for reaction with tetrahydrofuran and which can be carried out over a relatively broad temperature range to achieve excellent yields on the order of 94–98%. Another object of the invention is to provide a particularly valuable activated aluminum oxide catalyst for the generally known reaction of tetrahydrofuran with hydrogen sulfide to form tetrahydrothiophene under easily controlled conditions and with a long catalyst life. It is also an object of the invention to provide a more economical process for producing tetrahydrothiophene in which the catalyst is easily prepared from inexpensive substances and in which there is no recycle or substantial waste of unreacted hydrogen sulfide. These and other objects and advantages of the invention will become more readily apparent upon consideration of the following detailed disclosure.

It has now been found, in accoradnce with the invention that tetrahydrothiophene can be obtained in a very advantageous manner in the reaction of tetrahydrofuran with hydrogen sulfide at an elevated temperature and in the presence of an aluminum oxide catalyst provided that the reaction is carried out in the presence of a substantially pure aluminum oxide activated with a coating of at least about 0.1% by weight, e.g. from about 0.2 to 10% by weight and most preferably from about 0.2 to 3% by weight of silica.

The tetrahydrofuran and hydrogen sulfide are most advantageously reacted in a molar ratio of approximately 1:1, i.e. in approximately stoichiometric amounts in accordance with the known reaction equation

It is also possible, however, to use other molar ratios, for example 0.5:1 to 2:1 although a much narrower range of about 0.9:1 to 1:0.9 is of considerably greater advantage. The reaction according to the process of the invention can be carried out over a wide range of temperatures. Although temperatures of from 200 to 450° C. have been found to be quite suitable, the reaction is preferably carried out at temperatures of from about 380° C. to 450° C. Within this high but relatively broad temperature range, excellent yields can be readily obtained without carefully controlling temperatures within narrow limits dependent upon other process conditions.

The activated aluminum oxide catalyst used in the process according to the invention can be prepared in a number of different ways, but the following methods have been found to be particularly suitable.

Method A

Purified aluminum oxide is first treated with an aqueous sodium silicate solution (waterglass). The aqueous sodium silicate solution applied to the aluminum oxide is then concentrated by evaporation to dryness, after which the coated product is treated with aqueous hydrochloric acid and washed until neutral with distilled water. The catalyst is dried and may then be used directly in this form. However, after drying the silica-coated product is preferably heated at temperatures from about 300° C. to 400° C. for a period of time sufficient to fully activate the aluminum oxide catalyst.

Method B

It is also possible to treat a moist purified aluminum oxide, i.e. in the presence of a small amount of water, with silicon tetrachloride in an organic solvent, e.g. as diluted with hexane, and then to wash the product with water until it is neutral. The silica is thereby precipitated onto the surface of the aluminum oxide. After washing carefully with distilled water until the wash water shows a neutral reaction, the catalyst is dried and is then ready for use. It is again preferable, however, to subject this dried catalyst to the same heat treatment at about 300–400° C. as described in Method A.

The aluminum oxide employed for purposes of this invention must be purified and must not contain any alkaline residues. It has been found to be particularly advantageous as a general rule for ensuring excellent yields to use an aluminum oxide activated by a coating of from about 0.2 to 5% by weight of silica. It is also possible of course, to apply heavier coatings. For example, a catalyst consisting essentially of aluminum oxide with a coating of 10% by weight of silica have also been found to be useful.

After the silica has been deposited in the form of $SiO_2$ onto the aluminum oxide, the catalyst must be washed neutral and should not contain any residues of acids such as hydrochloric acid. Thus, the finished catalyst is essentially a neutral material, i.e. one which is neutral reacting in all tests for acids and bases.

The initial aluminum oxide is preferably a granular material which can have a relatively broad range of particle sizes. However, it is advantageous to employ particles which are sufficiently large to be used in a fixed or stationary catalyst bed as opposed to a fluidized bed. Suitable particle sizes thus may range from 0.5 mm. up to about 8 mm., preferably on the order of 2 to 4 mm.

To carry out the process according to the invention, the catalyst can be introduced as a fixed bed into a conventional reactor, for example a vertically arranged tube. The reaction zone represented by the catalyst bed is heated to an elevated temperature of preferably at least 380° C. to 450° C. Before entering the reaction zone, the gaseous reactants are advantageously preheated to a temperature of from about 100° C. to 400° C. Hydrogen sulfide and tetrahydrofuran are then most favorably introduced into the reaction vessel in approximately equimolar quantities. Although the loading of the catalyst, which is often referred to as the space velocity or throughput per unit of catalyst, i.e. the quantity of tetrahydrofuran introduced per ml. of catalyst per hour, can be varied within relatively wide limits, it has been found to be particularly desirable to carry out the reaction at a loading of from about 0.2 to 0.5 grams of tetrahydrofuran per ml. of catalyst per hour. However, this loading or throughput per unit of catalyst can be even higher, e.g. up to about 0.8 grams of tetrahydrofuran per ml. of catalyst per hour.

Very high yields are obtained in the process according to the invention. There is no longer any need to employ hydrogen sulfide in a large excess which must then be removed on completion of the reaction. Accordingly, there is also no longer any need to recycle relatively large quantities of hydrogen sulfide gas. This not only considerably simplifies the process but also appreciably reduces the energy requirements.

The catalyst used in the process of the invention is extremely easy to prepare. There is not need to synthesize heteropoly acids. Moreover, the catalyst when used in the process of the invention has an almost unlimited effective life, i.e. so as to maintain the desired high yields over a long period of operation. Thus, under the most advantageous conditions of the invention, the yields are almost quantitative with reference to both of the initial reactants, a result which has not been previously achieved when reacting tetrahydrofuran with hydrogen sulfide.

The process according to the invention also provides an extremely pure product. By-products are relatively few in number and are formed in very limited quantities only. Further purification, if desired, can be easily accomplished in a conventional manner.

The invention is further illustrated but not limited by the following examples. The abbreviation "THF" is employed in the examples to designate tetrahydrofuran while the abbreviation "THT" designates tetrahydrothiophene as the desired product.

Example 1

56 grams of granulated aluminum oxide (particle size =2 mm.) were soaked with 10 ml. of a waterglass solution. The mixture was then dried in a rotary evaporator at a bath temperature of 150° C. The dried catalyst was then heated for 2 hours at 300° C. in the presence of air.

The silica-coated catalyst prepared in this manner was then introduced into a 550 ml. of long glass reactor tube with an internal diameter of 20 mm. which was fitted at its lower end with a 5 mm. wide and 150 mm. long discharge tube and at its upper end with a standard round sleeve (NS 29) having a 5 cm. thick plug of glass wool in its lower portion. The reactor tube thus filled with 100 ml. of the catalyst was introduced into a 500 mm. long tubular oven with a temperature-measuring means located in the central part of the oven. The discharge tube at the lower end of the reaction tube was provided with a spiral condenser and a receiver. A headpiece provided with a dropping funnel and a gas inlet pipe as inlet means for the reactants was arranged at the upper end of the reaction tube.

While the oven was heated to 410° C., the entire apparatus was flushed with nitrogen. After the oven temperature had been reached, the stream of nitrogen was regulated to approximately one bubble per second and the two reactants introduced into the reaction tube in a molar ratio of 1:1. Tetrahydrofuran was introduced from the dropping funnel in a quantity of 0.5 mol per hour, while the gaseous stream of hydrogen sulfide was controlled with a rotameter and similarly introduced into the upper end of the reaction tube for concurrent flow with the tetrahydrofuran.

During the reaction, water and tetrahydrothiophene collected in two layers in the receiver. The yield of tetrahydrothiophene amounted to 96.7%.

Further test results are set out in the following Table I. The apparatus was the same as described in Example 1 and the same quantity of catalyst was also used in each instance.

TABLE I

| Example No. | Throughput of reactants THF (mols./hr.) | $H_2S$ (mols./hr.) | Temperature (° C.) | THT yield (percent) |
|---|---|---|---|---|
| 2 | 0.5 | 0.5 | 370 | 89.6 |
| 3 | 0.5 | 0.5 | 390 | 94.8 |
| 4 | 0.5 | 0.5 | 430 | 98.1 |
| 5 | 0.5 | 0.5 | 450 | 97.2 |
| 6 | 0.5 | 0.55 | 420 | 97.4 |
| 7 | 0.55 | 0.5 | 420 | 97.0 |
| 7a | 0.8 | 0.9 | 420 | 78.8 |

If an aluminum oxide activated with sodium tungsto-phosphate is used instead of the catalyst according to the invention in the same reaction of tetrahydrofuran with hydrogen sulfide, much lower yields are obtained as can be seen from the following Table II. In addition, impurities are formed in considerable quantities.

Comparison Examples

In order to prepare the catalyst, 2 grams of sodium tungsto-phosphate were dissolved in water and 100 grams of granulated aluminum oxide were added to the resulting solution. The mixture was then concentrated by evaporation to dryness in a rotary evaporator, and finally heated to 150° C.

The following Examples 8 to 10 in Table II are based upon tests carried out exactly as in Example 1 except for the use of the modified catalyst.

TABLE II

| Example No. | Throughput of reactants of starting compounds THF (mols/hr.) | $H_2S$ (mols/hr.) | Temperature (°C.) | THT yield (percent) |
|---|---|---|---|---|
| 8 | 0.5 | 0.5 | 275 | 81.6 |
| 9 | 0.5 | 0.5 | 300 | 71.8 |
| 10 | 0.5 | 0.5 | 340 | 48.0 |

In addition to water and hydrogen sulfide, the reaction product of Example 8 contains 12.2% of tetrahydrofuran and 6.2% of impurities, the reaction product of Example 9 contains 20.2% of tetrahydrofuran and 8% of impurities and the reaction product of Example 10 contains 39.5% of tetrahydrofuran and 22.5% of impurities. At temperatures around 400° C., there is practically no further reaction, the initial materials merely being decomposed. Thus, the previously suggested activation of aluminum oxide with the sodium salt of a heteropoly acid leads to results which are distinctly inferior to the results of the present invention. Moreover, the purity of the product obtained in accordance with the process of this invention is substantially higher.

The utility of tetrahydrothiopene has been amply disclosed in the prior art, e.g. as an additive for fuel gas or as an intermediate for conversion into a wide variety of other useful compounds such as biocides in which the tetrahydrothiophene is chlorinated. Under these circumstances, the importance of obtaining tetrahydrothiophene in high yields and excellent purity should be apparent.

Minor variations or modifications of the process according to the invention and its specific catalyst consisting essentially of aluminum oxide coated with a small amount of silica can be easily adopted by one skilled in this art without departing from the spirit or scope of the invention.

What is claimed is:

1. In a process for the production of tetrahydrothiophene by reacting tetrahydrofuran with hydrogen sulfide at an elevated temperature in the presence of an aluminum oxide catalyst, the improvement which comprises carrying out said reaction at a molar ratio of tetrahydrofuran: hydrogen sulfide of about 0.5:1 to 2:1 and at a temperature of about 200° C. to 450° C. while employing as the catalyst a substantially pure aluminum oxide free of acid and alkaline residues and activated with a surface coating of at least about 0.1% up to about 10% by weight of silica.

2. A process as claimed in Claim 1 wherein said aluminum oxide is coated with 0.2 to 3% by weight of said silica.

3. A process as claimed in Claim 1 wherein said tetrahydrofuran and hydrogen sulfide are reacted in a molar ratio of approximately 1:1.

4. A process as claimed in Claim 3 wherein said reaction is carried out at a temperature of about 380° C. to 450° C.

5. A process as claimed in Claim 1 wherein approximately 0.2 to 0.5 grams of tetrahydrofuran are reacted per ml. of catalyst per hour.

6. A process as claimed in Claim 1 wherein said reaction is carried out with a molar ratio of tetrahydrofuran to hydrogen sulfide of about 0.5:1 to 2:1, at a temperature of about 200° C. to 450° C. and in the presence of said aluminum oxide catalyst having a coating of about 0.2 to 5% by weight of silica.

7. A process as claimed in Claim 6 wherein said molar ratio of tetrahydrofuran to hydrogen sulfide is approximately 1:1, the reaction temperature is about 380° C. to 450° C. and said aluminum oxide is activated by a coating of about 0.2 to 3% by weight of silica.

8. A process as claimed in Claim 1 wherein said silica coating is obtained by applying to the substantially pure aluminum oxide an aqueous sodium silicate solution which is then evaporated to dryness, and the resulting product is then treated with aqueous hydrochloric acid, washed neutral and dried.

9. A process as claimed in Claim 8 wherein said catalyst is subjected to a heat treatment at about 300° C. to 400° C. after being washed neutral and dried.

10. A process as claimed in Claim 1 wherein said silica coating is obtained by treating a moist purified aluminum oxide with silicon tetrachloride in an organic solvent for precipitation of silica onto the aluminum oxide and washing neutral and then drying the coated product.

11. A process as claimed in Claim 10 wherein said catalyst is subjected to a heat treatment at about 300° C. to 400° C. after being washed neutral and dried.

References Cited

UNITED STATES PATENTS

| 2,899,444 | 8/1959 | Loev, et al. | 260—329 |
| 2,839,475 | 6/1958 | Innes | 252—451 |
| 2,285,396 | 6/1942 | Danforth, et. al. | 252—254 |
| 2,216,262 | 10/1940 | Bloch, et. al. | 23—233 |
| 1,266,782 | 5/1918 | Ellis | 252—451 |
| 1,835,420 | 12/1931 | Neundlinger | 252—451 |

OTHER REFERENCES

Venuto, et al.; "Organic Catalysis over Crystalline Aluminosilicates," (*Advances in Catalysis*, Vol. 18, Academic Press, N.Y., 1968), pp. 259–61, and 352–6.

JOHN D. RANDOLPH, Primary Examiner

C. M. S. JAISLE, Assistant Examiner

U.S. Cl. X.R.

252—455

UNITED STATES PATENT OFFICE
CERTIFICATE OF CORRECTION

Patent No. 3,819,651                     Dated June 25, 1974

Inventor(s) Ernst Worbs, Helmut Magerlein and Gerhard Meyer

It is certified that error appears in the above-identified patent and that said Letters Patent are hereby corrected as shown below:

Column 1, line 45, beginning with "When" cancel all to and including "temperature" in line 50, same column 1.

Column 2, line 11: "accoradnce" should read -- accordance --

Column 2, formula: "$H_2$" should read -- $CH_2$ --

Column 2, line 53: "drying the" should read -- drying, the --

Column 3, line 20: "from 0.5" should read -- from about 0.5 --

Column 3, line 51: "not" should read -- no --

Column 4, Table I, last column heading "(percent" should read -- (percent) --

Column 5, line 11: "tetrahydrothiopene" should read -- tetrahydrothiophene --

Column 5, lines 41,42: "reac-action" should read -- reac-tion --

Signed and Sealed this eleventh Day of May 1976

[SEAL]

Attest:

RUTH C. MASON
Attesting Officer

C. MARSHALL DANN
Commissioner of Patents and Trademarks